Figure 1:
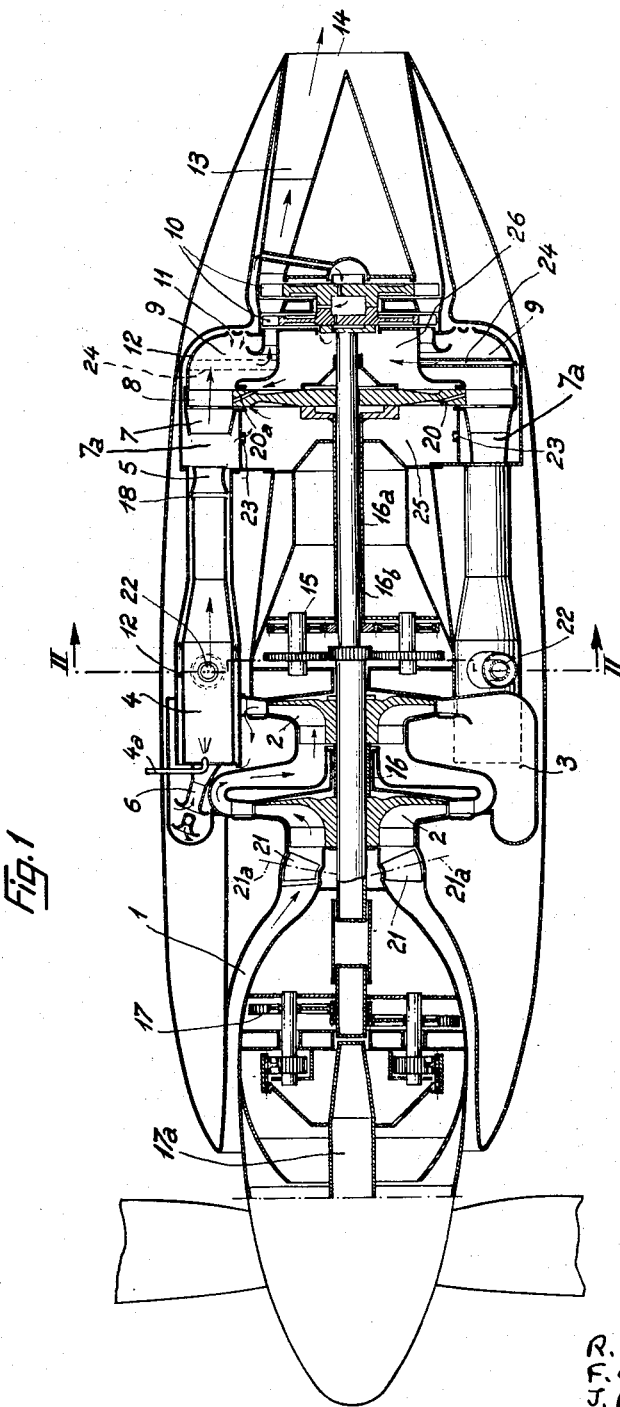

June 5, 1956    R. H. MARCHAL ET AL    2,748,564
INTERMITTENT COMBUSTION GAS TURBINE ENGINE
Filed March 7, 1952    2 Sheets-Sheet 1

INVENTORS
R. H. Marchal
F. G. Paris
J. Bertin
L. A. J. Bauger
By Watson, Cole, Grindle & Watson
ATTYS June 5, 1956  R. H. MARCHAL ET AL  2,748,564
INTERMITTENT COMBUSTION GAS TURBINE ENGINE
Filed March 7, 1952  2 Sheets-Sheet 2
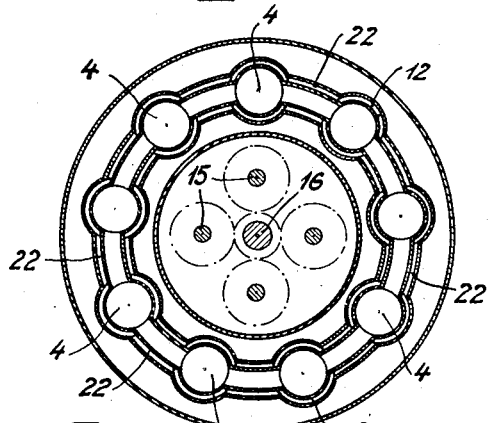
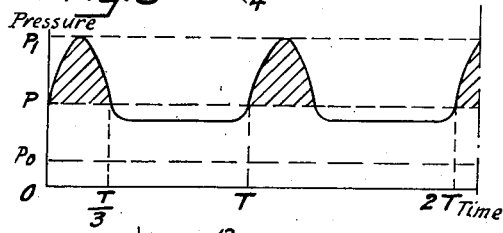
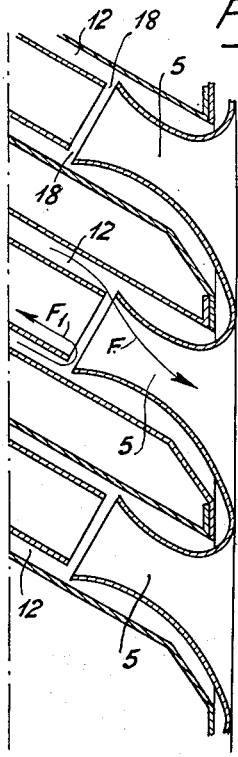
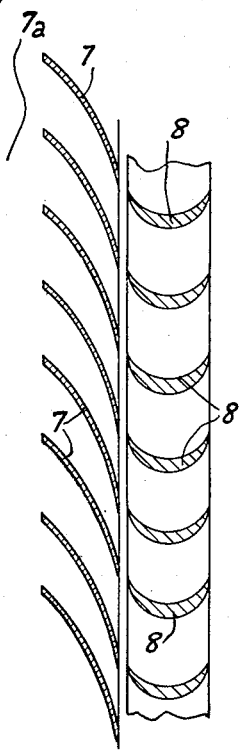
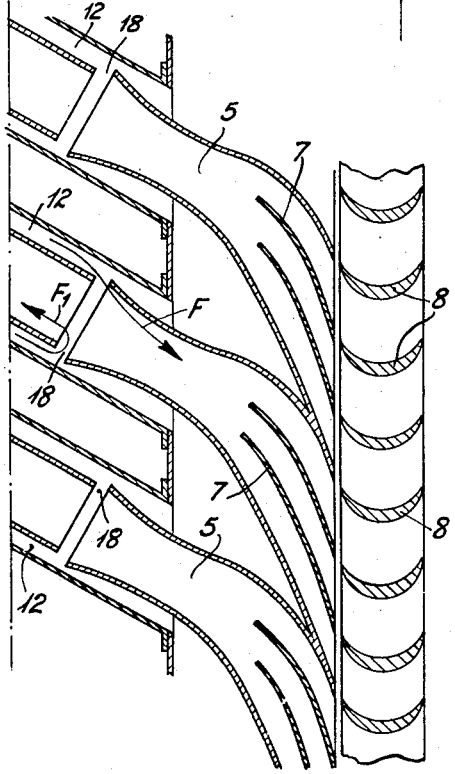
INVENTORS
R. H. Marchal
F. G. Paris
J. Bertin
L. A. J. Bauger
By Watson, Cole, Grindle & Watson
ATTYS

United States Patent Office 2,748,564
Patented June 5, 1956

2,748,564

INTERMITTENT COMBUSTION GAS TURBINE ENGINE

Raymond H. Marchal, Paris, François G. Paris, Chaville, Jean Bertin, Neuilly-sur-Seine, and Louis A. J. Bauger, Vanves, France, assignors to Societe Nationale d'Etude et de Construction de Moteurs d'Aviation, Paris, France, a company of France Application March 7, 1952, Serial No. 275,312

Claims priority, application France March 16, 1951

7 Claims. (Cl. 60—35.6)

Gas-turbine engines are usually of the constant-pressure cycle type, i. e. the whole amount of air required by the engine is compressed, in the compressor of the engine, up to a certain pressure level which is maintained during combustion of fuel within this air. This combustion which takes place at a substantially constant pressure, is effected inside combustion chambers to which air and fuel are supplied in a constant mass ratio, thus ensuring continuous combustion.

The burnt gases resulting from combustion are at a very high temperature in the combustion chambers (2200° to 2500° C.). Their temperature at the outlet of these chambers is lowered to a convenient value with regard to the mechanical strength of the materials, by a dilution of these gases by air from the compressor. The flow of these gases through the combustion chambers gives rise to a pressure loss; in other words, the pressure at the outlet of the chamber is lower than the inlet pressure of the air.

When expanding through the turbine, the gases supply the energy required for driving the compressor and it is possible to use the excess energy of the gases by expanding them further. This can be effected in the turbine (or in a further turbine or turbine wheel), as in the case of stationary plants, or power plants of ships and locomotives or aircraft engines known as turbo-propellers; alternatively the expansion can take place in a propulsion nozzle thus converting the potential or pressure energy still available into kinetic energy which is used for propelling a movable body by reaction, as in the case of turbojet engines.

Jet propulsion engines are known which do not comprise any air compressor or turbine. These engines are called pulse jet units and include a resonant-firing combustion chamber fed with fuel and air at atmospheric pressure (this air supply being effected through valve means or an inlet allowing free flow of air towards the chamber while hindering back flow of combustion gas in the opposite direction) and a rearwardly directed exhaust pipe allowing the combustion gases to expand and imparting thereto a high velocity. Combustion takes place in a pulsatory way which is automatically sustained at the frequency of a sound pipe of similar design as said unit, that is to say at a proper frequency depending on the length of the unit. The exhaust pipe is not only designed for imparting velocity to the pulses of combustion gas but also for ensuring scavenging of the combustion chamber by creating therein a vacuum due to the pulses of combustion gas travelling rapidly through the exhaust pipe and thereby acting as gaseous pistons.

As the combustion cycle is performed, in these resonant-firing combustion chambers, at a substantially constant volume, pressure rises in the chamber during combustion. This increase in pressure in the chamber gives rise, at the outlet of the exhaust pipe, to a pulse of burnt gases at high velocity, i. e. having a large amount of kinetic energy. These chambers are therefore true kinetic energy generators.

Tests have shown that the kinetic energy of the gases issuing from a pulsatory combustion chamber fed with atmospheric air at normal temperature and pressure, amounts to about 8 to 10% of the total heat energy introduced into the combustion chamber.

The object of the present invention is to apply such pulsatory combustion chambers to gas-turbine engines provided with an air compressor.

These chambers being fed with air under pressure discharged by the compressor, the increase in pressure and temperature of the air delivered, due to the previous compression effected by the compressor, further increases the percentage of heat energy converted into kinetic energy in the exhaust pipe. This is due to the fact that the combustion is improved, in an atmosphere under pressure, which results, in the chamber, in a further increase in pressure during combustion at substantially constant volume.

By directing the high velocity pulses of gases issuing from the exhaust pipe, towards the blades of a turbine adequately designed for using the kinetic energy of the motive fluid, it is possible to convert the kinetic energy of the pulses into mechanical energy available at the output shaft of this turbine. The gases issuing from this turbine have a high static pressure, and can therefore perform work at constant pressure, in one or more turbine wheels, or in a jet propulsion nozzle, or in both.

If it is assumed that the efficiency amounts to 50% (a rather moderate value which can be undoubtedly exceeded), for the conversion of the kinetic energy of the pulses into mechanical energy, a fraction equal to 5% of the total heat energy introduced into the combustion chambers will be recovered and added to the shaft of the engine; this percentage corresponds to an increase of 20 to 25% of available power and of heat efficiency (i. e. of the fuel consumption) as compared with a conventional engine operating with the same cycle.

The object of the present invention is to provide a gas-turbine engine comprising a primary turbine wheel of the impulse type or operating with a certain degree of reaction, an air compressor and one or more pulse jet units which are fed with air by the compressor and provided with an exhaust pipe opening towards a part of the stationary blades arranged ahead of said turbine wheel, the pipe of each unit being adapted to transform into kinetic energy at least the energy which corresponds with the pressure waves in the corresponding combustion chamber.

A further object of the invention is to provide means for using the residual energy under constant pressure remaining in the gases flowing from said primary turbine wheel.

Fuel is permanently supplied, in a finely divided state, to the combustion chambers. Ignition of the fuel is carried out, in a conventional way, by a spark-plug, at the start, and in normal operation by the previous combustion pulse itself.

The turbine using kinetic energy of the gas pulses will be called hereafter and in the subjoined claims "a velocity-absorbing turbine" to mean a turbine operated essentially by the velocity of motive gases rather than by their pressure. Velocity-absorbing turbines are well known; in such turbines there is either no change in pressure as the gases pass the blade-ring (e. g. "impulse turbines") or a minor decrease in pressure (e. g. "reaction turbines"). Velocity-absorbing turbines are therefore distinct from "expansion turbines" which are operated essentially by the pressure of the gases, these turbines being designed for converting the pressure energy of the gases into work.

When an impulse turbine is used, the static pressure of the fluid is the same at the discharge end of the compressor, at the inlet of the stator blades and at the outlet of the impulse turbine wheel.

An advantage of this embodiment is that the manifold collecting the exhaust gases of the turbine can be directly connected to the discharge end of the air compressor, thus facilitating dilution of the gases and cooling them before they are made to work in expansion turbine or turbines.

Thus, a continuous flow of hot gases at constant pressure issues from the velocity-absorbing turbine and is made to expand in the remainder of the engine.

Other objects and advantages of the invention will be apparent during the course of the following description.

In the accompanying drawings in which like reference characters are employed to designate like parts throughout the same, Fig. 1 is a diagrammatic axial section of a form of aircraft turbopropeller, according to the invention, Fig. 2 is a cross-section taken along line II—II of Fig. 1, Fig. 3 is graph showing the variations in pressure in the combustion chambers in terms of time, Figs. 4 and 5 are diagrammatic developed views of nozzles at the outlet of the exhaust pipes and of the stator blades of the impulse turbine.

In the case of an aircraft engine, air is sucked up through the diffusor 1 which converts into pressure the kinetic energy of the air due to the speed of the aircraft. This air is then compressed in a compressor 2 which is of the radial-flow type in the example illustrated but which may be of the axial-flow or helical type. At the outlet of the compressor, the air under pressure is collected in an annular manifold 3 and supplied to the pulsatory combustion chambers 4 located around the shaft of the engine. By means of a ring of vanes 21 pivoting about axes 21a and disposed in the intake to the compressor, it is possible to adjust the pressure ratio and the output of the compressor. This arrangement ensures an easy crossing of the rather delicate surging zone when the engine is started. The vanes also allow of reduced rates of operation of the turbine whilst maintaining a high efficiency of the compressor. They therefore provide a great flexibility to the engine. From the annular manifold 3, air under pressure is introduced into each combustion chamber 4 through a freely open inlet or duct 6 adapted to have a low resistance to flow in the feed-direction towards the chamber 4 and a high resistance in the opposite direction, this duct thus forming a kind of aerodynamic valve. Various types of such ducts are known at present.

At the end of each chamber opposite the inlet duct 6, there is provided an exhaust pipe ending with an expansion nozzle 5.

The pulsatory chambers 4 are continuously supplied, during operation, with a convenient fuel: e. g. gasoline, petrol, oil, fuel-oil, pulverised coal, etc. This fuel is fed through a duct 4a into which it is discharged by a pump (not shown). The chambers are connected to each other by tubes 22. The first ignition may be effected by means of a spark-plug and the subsequent ignitions automatically occur due to the previous combustion pulse. The successive combustions or explosions automatically adjust themselves to the frequency of the sound pipe which every chamber forms. During each combustion which takes place at substantially constant volume, the pressure rises in the chamber and the burnt gases rush through the nozzle 5 (they cannot escape through the inlet duct 6, or at any rate an appreciable fraction of them, owing to the constitution of this duct). Toward the end of each combustion, the expansion wave gives rise to a depression in the chamber. This depression promotes intake into the chamber, through 6, of the air under pressure from the manifold 3, a new combustion occurs, and so forth.

This cycle is illustrated by the diagram of Fig. 3 which shows the graph of the values of pressure obtaining in each combustion chamber, in terms of time. P stands for the discharge pressure of the compressor 2, i. e. the feed pressure of the chambers, and $P_0$ for atmospheric pressure. T stands for the period of the cycle. The portions of the curve above the horizontal line P correspond to the increase in pressure from P to $P_1$ during each combustion, then its decrease from $P_1$ to P as gas exhaust proceeds. Each of these portions extend over about a third of the period. The portions of the curve below P correspond to the relative vacuum following, in the chamber, the exhaust of the burnt gases, this vacuum giving rise to a further intake of a charge of air.

The volume of the manifold 3 must be large enough, so that, even if all the chambers 4 suck simultaneously, substantially no pressure drop arises in this manifold. The nozzle 5 at the end of the exhaust pipe of each chamber 4 is so proportioned as to accelerate the burnt gases generated during constant volume combustion, thus making these gases to expand from their maximum pressure $P_1$ to a value approximately equal to the pressure P of the discharge of the compressor. In other words, the nozzles 5 only convert into kinetic energy, the pressure energy corresponding to the pulse, i. e. to the hatched portion of each cycle (Fig. 3).

Beyond the nozzles 5, there are arranged stator blades 7 which impart to the gases the optimum inlet angle with respect to the moving blades of an impulse turbine wheel 8. At the outlet of these blades, the gases have theoretically given up the whole of their kinetic energy and are collected in an annular manifold 9; the pressure obtaining in the latter is the same as that obtaining in the manifold 3 at the discharge end of the compressor and this manifold 9 is connected, as will be indicated hereafter, to this end. The potential energy of these gases corresponding to their temperature is then used in a constant inlet pressure turbine or expansion turbine which may include one or more wheels 10. The wheels 8 and 10 can be coupled so as to drive together the compressor 2 and possibly an effective power receiving apparatus. The drawing refers to the case wherein the shaft 16 of the compressor driven by the turbines, is extended and drives, through a step-down gearing 17, a propeller shaft 17a.

The impulse turbine wheel 8 has necessarily a large diameter. The reason is that the temperature of the gases at the inlet to this turbine is high, their specific mass is relatively low and since the injection velocity is determined by the velocity at the outlet of the expansion nozzle 5 of each pulsatory chamber 4, the passage cross-section of the blading requires blades of great height. In order to design a high-efficiency turbine, the blades of great height require a large diameter disc whose mean tangential velocity must however remain at a convenient value. The consequence is a rotational speed substantially smaller than that of other turbines. The mechanical coupling of turbines with a common power receiving apparatus, such as the compressor 2, must be made through a step-up gearing 15 which allows the angular velocities of the turbines to be taken into account. The shaft 16 of the compressor can be directly connected to the shaft 16a of the turbine 10, whereas the shaft 16b of the impulse turbine 8, which is hollow and surrounds the shaft 16a, is connected to the shaft 16 through the step-up gearing 15.

As in pulsatory combustion operation which is sustained in each chamber 4, the exhaust pulse lasts for about one third of the period, the high-temperature burnt gases are in contact with the blades 8 of the impulse turbine only during a third of the period. In other words, the time allowed for the transfer of heat and its evacuation through the blades of the turbine is twice as long as the time during which heat is evolved. It can be understood hence that the impulse turbine is capable of standing inlet temperatures of gases much higher than those which are usually admissible in the case of conventional gas turbines of the continuous flow type. For this reason, it will be often possible to operate the impulse turbine without diluting the burnt gases with fresh air before they are supplied to the blading 8 of this turbine.

In the illustrated embodiment, dilution is effected at the exhaust end of the pulsatory combustion chambers, by means of apertures 18 in communication with a duct 12 conveying compressed air from the manifold 3. On the drawing, this duct is formed between the combustion chamber walls and a sheathing disposed therearound. In this arrangement, the dilution air cools the walls of the chambers.

Anyway dilution is limited, and this is an advantage since losses of energy are unavoidable, and the smaller the mass of dilution air the lower these losses.

In Fig. 1, it has been assumed that the axes of the chambers 4, the exhaust pipes and the nozzles 5 were parallel to the general axis of the engine; actually these axes are inclined as shown in the development illustrated in Fig. 4; it has been further assumed that the stator blades 7 are fed from an annular manifold 7a into which all the nozzles 5 discharge.

Fig. 5 shows another form in which each nozzle extends up to the wheel and encloses several stator blades. The former arrangement is convenient when all the combustion chambers operate in synchronism, the latter arrangement when the chambers are out of phase.

Figs. 4 and 5 further indicate the two ways in which dilution air flows in through the annular apertures 18. Air is first drawn in, by aspiration effect, by the gas pulse, as indicated by arrow F. Then, during the vacuum following the pulse in the chamber, air is sucked up thereinto, as indicated by arrow F₁.

The blades of the impulse turbine which are preferably made of refractory alloy can be cooled internally by circulation of air. The cooling air may be taken for instance from the dilution air and led to the blades through apertures 20, 20a of the wheel disc.

For this purpose, apertures 23 connect the duct 12 to the chamber 25 which feeds the apertures 20 located on the front face of the turbine disc. The chamber 26 which feeds the apertures 20a located on the rear face of the disc, is connected to the air inlet duct 12 through one or more tubes 24 crossing the manifold 9.

The gases issuing from the impulse turbine and which are no longer pulsatory, are collected in the manifold 9. Their mean temperature reaches a value slightly lower than their temperature at the end of combustion in the chambers 4, but still too high for use in the continuous flow turbines 10. Dilution of these gases with air from the compressor is effected through the apertures 11 connecting the duct 12 to the manifold 9.

Burnt gases issuing from the turbines 10 exhaust through 14. In an aircraft engine such as illustrated, the remainder of their energy is used, in a nozzle 13 which provides an additional thrust.

The accessory parts of the turbine with pulsatory combustion chambers are the same as those of conventional gas turbines.

The machine can be very simply started in the same way as a pulsejet engine. A jet of compressed air is introduced into one of the pulsatory chambers while fuel is injected by means of an auxiliary pump. Ignition in this chamber, or simultaneously in two opposite chambers, will be carried out by means of a spark-plug and pulsatory combustion starts; the impulse turbine will be urged by pulses of hot gases issuing from the chamber, and rotation of this turbine will produce rotation of the compressor and other turbines. All the chambers are then supplied with air from the compressor and with fuel through the agency of the pump (not shown); ignition in the chambers is effected from the first chamber through the interconnecting tubes 22. The power of the impulse turbine rapidly rises and so does the rotation speed; the constant inlet pressure turbines in their turn supply power and the turbine is started. The injection of air and fuel into the starting chamber (or two chambers) is stopped. Hence, starting does not require, as in the case of conventional machines, a very powerful starter capable of bringing the turbine up to a high rotational speed.

The passages of the impulse turbine hinder back flow of the gases, and this aids the starting of the engine. Indeed when a combustion chamber discharges alone into the turbine, at the start, there can be no back flow of the burnt gases through the turbine towards the rear of another chamber. This phenomenon allows the starting of the turbine to be performed with only a single combustion chamber in operation; furthermore it is not necessary that all the pulsatory chambers are in synchronism and they may have any sequence of operation.

One or more of the turbine wheels can be coupled to shafts independent from the shaft of the air compressor and may drive separate power receiving apparatus. For instance, the impulse turbine 8 can drive only the air compressor, whereas the constant pressure turbines 10 drive the propeller. This case may also concern stationary electric power plants, for instance, or still propulsion plants for ships, locomotives or other vehicles. The turbine 8 combined if necessary with one of the wheels 10, can drive the air compressor, whereas one or more mechanically independent wheels 10 can drive an electric generator, the screws of a ship or the wheels of a locomotive or other vehicle.

In the case of a turbojet engine, a more or less important part of the energy contained in the gases which have performed work in the impulse turbine 8, or even the whole of this energy, is used for accelerating these gases in the exhaust nozzle. In such a case, the constant pressure turbine 10 can only comprise one wheel or can even be altogether done without.

On the other hand, the embodiments described above only provide for a partial expansion corresponding to the pressure wave of the pulse, between the combustion chambers and the turbine 8, the remainder of the expansion being performed subsequently.

However, these embodiments wherein the pressure downstream of the impulse turbine 8 is equal to the discharge pressure P of the compressor, are not the only ones possible.

For instance, it is possible to design the turbine so that it operates with a certain expansion of the gases below P either through the distributor 7 the passages of which are then converging instead of having a constant cross-section, or preferably through the movable blading 8, the said turbine operating in the latter case with a certain degree of reaction. In this case, the pressure at the inlet of the nozzles of the constant inlet pressure turbines 10 is smaller than the discharge pressure of the compressor. The dilution air which is mixed with the gases before they flow into these turbines and is supplied through the apertures 11 will then provide not from the discharge of the compressor, but from a convenient intermediate stage of this compressor, through ducts different from the ducts 12 conveying air to the apertures 18, or else the whole of the dilution air from the discharge of the compressor will be mixed with the gases between their exhaust from the nozzles 5 and their inlet into the stator 7 of the primary turbine 8, the apertures 18 being conveniently proportioned for this purpose.

What we claim is:

1. A gas-turbine engine comprising in succession and in series flow arrangement, an air compressor, a compressed air manifold into which said compressor discharges, the pressure obtaining in said manifold being substantially constant, a pulse jet unit sucking air from said manifold, a velocity-absorbing turbine operated essentially by the kinetic energy of gas pulses issuing from said pulse jet unit, a gas exhaust manifold for collecting the exhaust gas of said turbine, the pressure obtaining in said exhaust manifold being substantially constant, and a power producing device designed for expanding the gas supplied thereto by said exhaust manifold.

2. A gas-turbine engine as claimed in claim 1, further comprising a by-pass duct connecting the compressed air manifold with the gas exhaust manifold and by-passing the pulse jet unit and the velocity-absorbing turbine, whereby the exhaust gas thereof is diluted with air in said exhaust manifold.

3. A gas-turbine engine as claimed in claim 2, wherein the power producing device comprises a turbine of the constant inlet pressure type which is operated by diluted exhaust gas from the exhaust manifold.

4. A gas-turbine engine as claimed in claim 2, wherein the power producing device comprises a jet propulsion nozzle.

5. A gas-turbine engine as claimed in claim 2, wherein the velocity-absorbing turbine is an impulse turbine, whereby the pressure obtaining in the exhaust manifold is substantially equal to the pressure obtaining in the compressed air manifold.

6. A gas-turbine engine as claimed in claim 2, wherein the velocity-absorbing turbine is a reaction turbine, whereby the pressure obtaining in the exhaust manifold is smaller than the pressure obtaining in the compressed air manifold.

7. A gas-turbine engine as claimed in claim 2, further comprising an ejector tube associated with the pulse jet unit and coaxially arranged at the outlet thereof, said ejector tube being adapted to suck air from the by-pass duct.

References Cited in the file of this patent

UNITED STATES PATENTS

| | | |
|---|---|---|
| 1,180,403 | Leblanc | Apr. 25, 1916 |
| 2,515,644 | Goddard | July 18, 1950 |
| 2,526,281 | Ryan et al. | Oct. 17, 1950 |
| 2,543,758 | Bodine | Mar. 6, 1951 |
| 2,593,523 | Bauger | Apr. 22, 1952 |
| 2,612,749 | Tenney | Oct. 7, 1952 |

FOREIGN PATENTS

| | | |
|---|---|---|
| 270,945 | Switzerland | Dec. 16, 1950 |